United States Patent
Schuhrke et al.

(10) Patent No.: US 7,215,821 B2
(45) Date of Patent: May 8, 2007

(54) IMAGE PROCESSING METHOD FOR AUTOMATED CONTRAST MODIFICATION OF DIGITAL IMAGE DATA

(75) Inventors: Thomas Schuhrke, Munich (DE); Martin Rother, Munich (DE)

(73) Assignee: Imaging Solutions AG, Regensdorf (CH)

( * ) Notice: Subject to any disclaimer, the term of this patent is extended or adjusted under 35 U.S.C. 154(b) by 778 days.

(21) Appl. No.: 10/668,716

(22) Filed: Sep. 23, 2003

(65) Prior Publication Data

US 2004/0057630 A1 Mar. 25, 2004

(30) Foreign Application Priority Data

Sep. 24, 2002 (EP) .................................. 02021176

(51) Int. Cl.
- *G06K 9/40* (2006.01)
- *G09G 5/00* (2006.01)
- *H04N 9/64* (2006.01)

(52) U.S. Cl. .................. 382/254; 382/274; 345/67

(58) Field of Classification Search ............... 382/254, 382/262, 263, 274, 260; 345/617, 63, 77; 348/251, 254; 358/461

See application file for complete search history.

(56) References Cited

U.S. PATENT DOCUMENTS

| 5,012,333 | A | * | 4/1991 | Lee et al. ................... 358/520 |
| 5,150,421 | A | * | 9/1992 | Morishita et al. ........... 382/169 |
| 5,454,044 | A | * | 9/1995 | Nakajima ................... 382/132 |
| 6,285,798 | B1 | * | 9/2001 | Lee ........................... 382/260 |

FOREIGN PATENT DOCUMENTS

| DE | 3629409 A1 | 3/1988 |
| DE | 19703063 C2 | 8/1998 |
| DE | 10004631 A1 | 8/2001 |
| EP | 0377386 A2 | 7/1990 |
| EP | 0849940 A2 | 6/1998 |

* cited by examiner

*Primary Examiner*—Yon J. Couso
(74) *Attorney, Agent, or Firm*—Milde & Hoffberg, LLP

(57) ABSTRACT

The invention relates to an image-processing method for automated contrast modification of digital image data. At least one low and one high-frequency signal are formed based on the digital image signal of the image data; the low-frequency signal component is modified using a characteristic-curve function; and then the modified, low-frequency signal is again added to the high-frequency signal component. In order to prevent the occurrence of distracting artifacts, so-called "halos", the formation of the low-frequency signal component to be modified is formed in dependence upon the high-frequency image components.

7 Claims, 4 Drawing Sheets

IMAGE PROCESSING METHOD FOR AUTOMATED CONTRAST MODIFICATION OF DIGITAL IMAGE DATA

BACKGROUND OF THE INVENTION

The invention relates to an image-processing method for automated contrast modification of digital image data, in which at least a low and a high-frequency signal component are formed from the image signal of the image data; the low-frequency signal component is modified according to a characteristic-curve function; and then the modified, low-frequency signal component is then added to the high-frequency signal component.

Digital image data often include very great brightness differentials, and are therefore difficult to reproduce on photographic paper since these materials include a contrast range that is too narrow. Thus, copies of such images are over-exposed in the bright areas but under-exposed in the darker areas. Individual details are thus very difficult, or impossible, to discern in the under- or over-exposed areas. A classic example of this is a photograph of a shadowed gateway arch with an extremely bright background. Contrast modifications have been developed in order to improve the quality of such high-contrast photographs for printed pictures for such copies from digital image data.

One such procedure in which particularly the global contrast (gradation) of digital image data is modified is described in the German Patent No. DE 36 29 409 A1. This contrast modification procedure is based on subjecting the digital image data to frequency filtering in which they are split into a low-pass and a high-pass component. In order to optimize global contrast, the low-pass signals are modified based on a non-linear gradation separating line. The low-pass signals thus modified are then again added to the high-pass signals, whereby in general the high-pass signals are also modified in order, for example, to undertake focal sharpening of detail information contained in the image. Contrast modification is, however, exclusively realized within the low-pass component since the high-pass component does not allow any influence on global image sizes.

During application of such image-processing procedures for contrast modification, it has been shown, however, that undesirable effects are sometimes triggered with certain motifs. Thus, for example, a dark motif before a medium-density background may be so reproduced after image contrast modification that a very bright border arises about the dark motif that only matches the density of the background at a larger distance from the motif. Such an occurrence is called a "white halo" because of its appearance. In an opposite density constellation, so-called "black halos" may also be generated if a bright motif is to be reproduced against a medium-density background.

This problem with contrast modification procedures, in which conventional copies are made on photographic paper, has long been known. In this conventional procedure, contrast is modified by locally influencing the copy light, realized by the LED illuminating the negative, with a digitally-created mask. The mask thus reproduces a strongly-unfocused, inverted intermediary image of the motif to be copied. In this procedure, the halo phenomenon is avoided in that the very strong bright/dark interfaces that cause these phenomena are slightly displaced in the mask. This displacement results in areas in which the photographic paper is either too strongly or too weakly exposed, since the paper sensitivity to density gradations in these areas is very low. The effect is thus produced that the strong contrast transitions are displaced into almost invisible areas of densities. Such a procedure is described in the German Patent No. DE 197 03 063 C2. This approach for avoiding undesirable halos is not applicable, however, in an image-processing procedure for digital image data as described in the aforementioned DE 36 29 409 A1, since an unfocused mask which might be modified in the case of strong contrast transitions is not explicitly taken into account in this process.

SUMMARY OF THE INVENTION

It is therefore the principal object of the present invention to provide an image-processing method for contrast modification of digital image data such that the described "halo" occurrences may be prevented, or at least reduced.

This object, as well as other objects which will become apparent from the discussion that follows, are achieved, according to the present invention, by an image-processing method for automated contrast modification of digital image data wherein the low-pass formation is carried out in dependence upon the high-frequency components of the digital image data.

Strong contrast transitions in the image content are located in image areas in which high frequencies occur with high amplitudes. The halo effects occur during conventional modification procedures in these areas of large contrast transitions. It has been shown that these distracting effects occur during contrast modification of digital image data. It may be shown that they are caused by over-compensation in the area of the contrast transitions. These over-compensations are prevented, or at least reduced, by the invention in that the low-pass component of the image signal to be modified is added to a high-pass component of the signal in the areas of the critical spots. If the low-pass signal thus modified is reduced in order to undertake contrast modification, and subsequently combined with the high-pass signal, the over-compensations may be strongly reduced, and even prevented altogether in the ideal case. This result is achieved in that, by adding a high-pass component in the area of the contrast transitions to the low-pass component particularly in this area, a sharp mask is formed instead of an unfocused one. Thus, the contrast may be altered locally at each spot of the contrast transition or the dividing line without negative influence on the density prevailing on the other side of the line. The averaging, which approximately corresponds to the low-pass formation, occurs based on the invention only at a few image-data points in the area of the sharp line. The line is thus exactly reproduced under ideal conditions (upon addition of the overall high-pass component).

The formation of the low-pass signal is advantageously so formed based on the invention that the filter frequency used to form the low-pass signal is selected from the area of major contrast transitions to be different from more homogenous-density image areas. A local frequency varied dependent on local contrast range is used to form the low-pass signals for contrast modification. As in known contrast modifications for image-processing procedure, this low-pass signal is used for the formation of the higher-frequency signal components with which it is again combined after its reduction.

Another advantageous embodiment of the invention consists of the fact that formation of the low-frequency signal component is used as formerly with a constant filter frequency, but subsequently a higher-frequency component is added to the low-pass signal in the area of contrast transitions in order subsequently to obtain reduction in contrast.

This approach is particularly advantageous if, during the image-processing procedure, the image signal is split not only into a high- and a low-pass frequency component, but rather mid-frequency signal components are additionally split off. In this case, mid-frequency signal components are advantageously added to the low-frequency signal where contrast transitions are present in the image data.

In a particularly advantageous embodiment of the invention, the high-frequency components, i.e., the contrast transitions in which the low-pass signal is formed in a modified manner, are determined based on a so-called edge-detection procedure. The detection of edges within the image content occurs in general during image-processing procedures of digital image data within the scope of image sharpening. In order to allow a sharper, more precise image impression to occur, these edges are aligned during digital processing. The additional computer expense to determine the high-frequency image components is thus smaller when this information already determined from the image-sharpening process is used. Merely the edges of relevant frequency ranges must be selected.

This edge information is not available particularly when no image sharpening is to be performed, or when the sharpening step of the image-processing procedure results only after the contrast modification step of the image-processing procedure. In this case, the high-frequency image components may be determined from Fourier transforms of the image data.

Since Fourier transforms of digital image data are a relatively computer-intensive computing step, a particularly advantageous embodiment of the invention consists of determining the high-frequency image components from the compressed form of the image data. For this, the compressed image data are decompressed to the point that the image-data frequency spectrum is available, i.e., data decompression is ceased before the inverse transformation into local data is performed. The image data available after transformation of encrypting in the frequency spectrum are divided into blocks that may be assigned to specific image positions. In blocks in which a large number of high frequencies are represented, many contrast transitions are to be observed in the corresponding image areas. Based on the invention, image data from these blocks are filtered using a filter different from that used in those blocks that include only zeroes in the areas of high frequencies. The filter frequency used for the low-pass signal is therefore applied within the blocks of the compressed data in dependence upon occupation of the high frequencies. Use of compressed data is particularly advantageous, since a frequency spectrum may be evaluated without having to employ expensive computing steps such as Fourier transformation.

For a full understanding of the present invention, reference should now be made to the following detailed description of the preferred embodiments of the invention as illustrated in the accompanying drawings.

DESCRIPTION OF THE PREFERRED EMBODIMENTS

Figure 1:
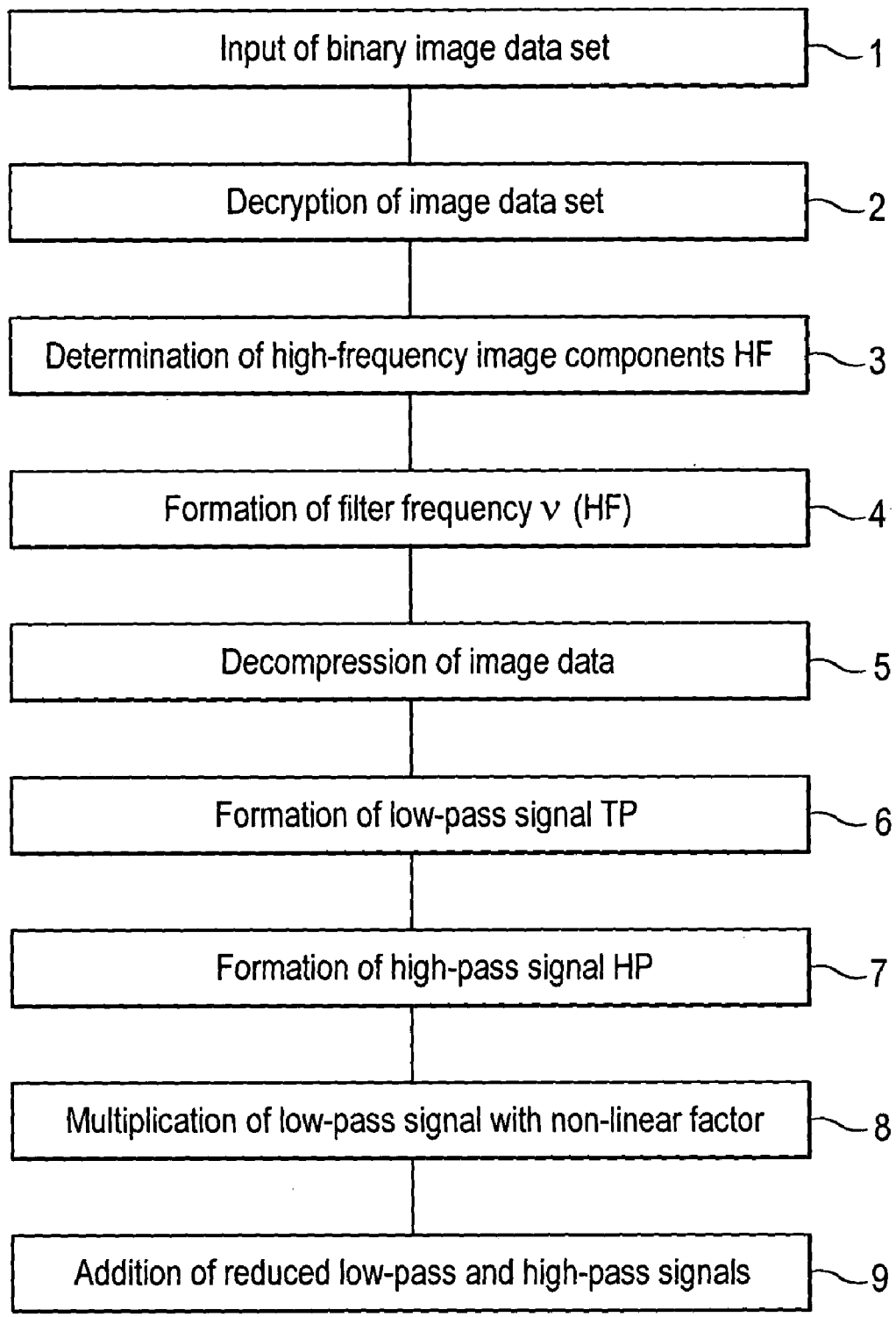
FIG. 1 is a flow chart of a contrast modification method of compressed digital image data which is used by the present invention.

The preferred embodiments of the present invention will now be described with reference to FIGS. 1–4 of the drawings. FIG. 1 provides an overview of the progression of an image-processing procedure for automated contrast modification of digital image data in which the invention is realized. The compressed image data to be processed are in binary form in step 1. These image data are decrypted in an image-processing procedure step 2. During the decryption process, the input bit stream, a single-dimensional vector, is transformed back into a two-dimensional matrix with different values. More specifically, three matrices exist after decryption: a $\gamma$ component for brightness, a Cb component for one color, and a Cr component for an additional color. Such decryption procedures are known, and may be accessed as public-domain software. In the case of data compressed by the current JPEG procedure, each of the matrices is divided into 8×8 value blocks. The JPEG procedure is used as an example in this embodiment example, but the invention may be used with other compression procedures in which the compressed image data are present in the frequency spectrum and an assignment to the location within the image data set is possible. Thus, the invention may also be applied, for example, to image data compressed using JPEG 2000. A pre-condition is that the position of the blocks within the matrix corresponds to a specific position of the pertinent image data in the output picture, as is the case with image data compressed using JPEG. In this compression procedure, each block includes a DC component that is occupied with the median block value in the upper left of the block. This component provides an indication of the image density in the area of the 8×8 block. The other values in the matrices, the AC components, are frequency values, whereby the AC components of the lower frequencies are located in the vicinity of the DC components, the AC components of higher frequencies are at the edge of the block, and the frequency increases proportional to the distance from the DC components. If, for example, only zeroes exist in the lower right quadrants of the blocks, this means that no great color or brightness differentials exist in the image area that corresponds to this block, depending on the matrix analyzed. If, however, high values of the AC components gather at edges away from the DC components, then the image content at the corresponding positions includes contrast transitions. High values of AC components within the matrix, the $\gamma$ components, are an indication of strong brightness disparities, and thus indicate critical image points at which the danger of creation of the halo effect is very great during contrast modification. High AC component values in the matrices that reflect the color components are then relevant when modification in color contrast is to be performed. If, on the other hand, only a contrast modification in image brightness is involved, then it is sufficient to observe the matrix of the components. Disparities in brightness, i.e., high-frequency image components, may be determined from the values with which the AC components occupy the blocks. This is done in step 3.

It is thus known in which blocks the image data have largely homogenous density, and in which blocks brightness disparities are indicated in the image content. This information is used to form the filter frequency for low-pass filtering in a step 4. This filter frequency is so selected that a very low frequency is selected in the area of the very homogenous image data of representative blocks so that exclusively very low frequencies are contained within the low-pass signal. A very high frequency is selected for image data represented by blocks that include very high AC components along edges so that the low-pass signal to be formed later contains a comparatively large component of high frequencies. The low-pass signal formed in step 6 after the image data are decompressed in step 5 is thus reproduced in largely homogenous image areas with very poor sharpness, while a comparatively sharp reproduction of the image content is formed in image areas containing contrast transitions. The high-pass signal is derived in a step 7 by subtraction of the low-pass signal from the overall image signal.

In step 8, the actual contrast modification is performed so that the low-pass signal formed in step 6 is loaded with a non-linear function. Thus, the entire low-pass component of the image signal is reduced, and the contrast range is strongly reduced. In a final image-processing procedure step 9, this reduced low-pass signal is subsequently added to the high-pass signal. From this addition, one may obtain a contrast-reduced total signal in which the detail information of the image content represented by the high-pass signal is preserved. Particularly, image data of this total signal contain no halo effects. These are prevented in that the low-pass component contains very high frequencies in the area of contrast transitions, which causes the low-pass component here to represent very closely the progression of the original total signal. This connection will be explained in FIGS. 3 and 4 after description of another embodiment example.

Figure 2:
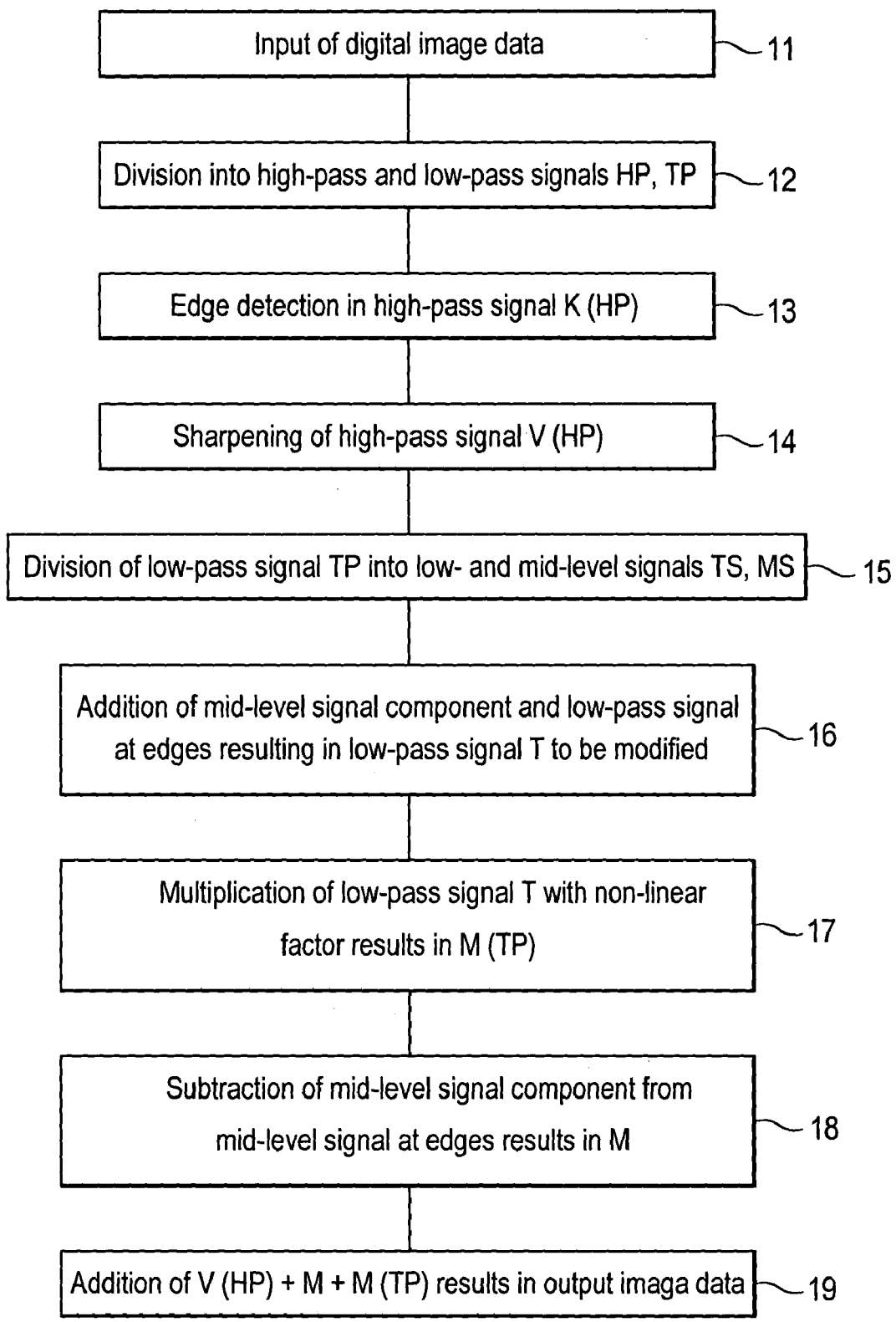
FIG. 2 is a flow chart of a contrast modification method according to the present invention that is combined with a method to increase sharpness.

Another advantageous method that may be used for low-pass formation according to the invention is illustrated in the second exemplary embodiment shown in FIG. 2. One starts with non-decompressed digital image data that are input into step 11. These image data are divided into a high-pass and a low-pass signal in a step 12 using a pre-selected filter frequency. In an image-processing method step 13, contrast transitions, or so-called edges, are detected within the high-pass signal. Such edge detection processes are well known in the realm of image processing, particularly image sharpening. The result of this edge-detection process used for image sharpening possesses an additional advantageous application. As in conventional image processing, the edge-detection process may also be used to undertake a sharpening of the high-pass signal in a step 14. Depending upon the structure of the software and hardware with which the image-processing procedure is implemented, it may be more advantageous to execute the steps in the described sequence, or to execute these and subsequent steps in another sequence, or in parallel with each other. In serial sequence, the splitting of the low-pass signal into a further low and mid-range signal occurs in an image-processing method step 15. Thus, a low signal for contrast modification is created that contains only the lowest frequencies of the image and allows an extreme modification of the contrast range. The mid-pass signal may also be influenced, or it may be left in its original form. This splitting into several high, mid, and low-level signals is applied in some image-processing procedures in which a differentiating approach is desirable in contrast and sharpening of image data.

According to the invention, a component of the mid-pass signal is added to the low-pass signal in those image areas identified as edges so that a low-pass signal dependent on edges and image content results for contrast modification. In a method step 17, the contrast range is reduced in that the low-pass signal formed and modified in step 16 is multiplied by a non-linear characteristic curve. This produces a contrast-reduced low-pass component which, according to the invention, reproduces the progression of the edges relatively sharply in the area of contrast transitions based on the contained high-frequency component.

The component of the mid-pass signal that was used to form the modified low-pass signal must now be taken into account in an image-processing method step 18, before combining low and mid-pass signals with the modified high-pass signal. In order to prevent this component from being input twice, it is subtracted from the mid-pass signal. Finally, the improved total signal results in an image-processing method step 19 wherein the sharpened high-pass signal, the modified, contrast-reduced low-pass signal, and the adjusted mid-pass signals are added.

This method may be expanded without limit in that the original signal may be divided into any number of frequency components that, depending on the image result desired, are sharpened or reduced in range, which depends entirely on the selection of the characteristic-curve function with which it is loaded. Based on the invention, advantageously, no constant filter frequency need be used during formation of the frequency components, but rather, the filter frequency is formed for the specific range depending on the high-frequency component image components or contrast transitions or edges. The procedure recommended for the embodiment example in FIG. 2 may be expanded in that even signal components of several frequency bands may be compiled in the area of contrast transitions of very large range.

Figure 3:
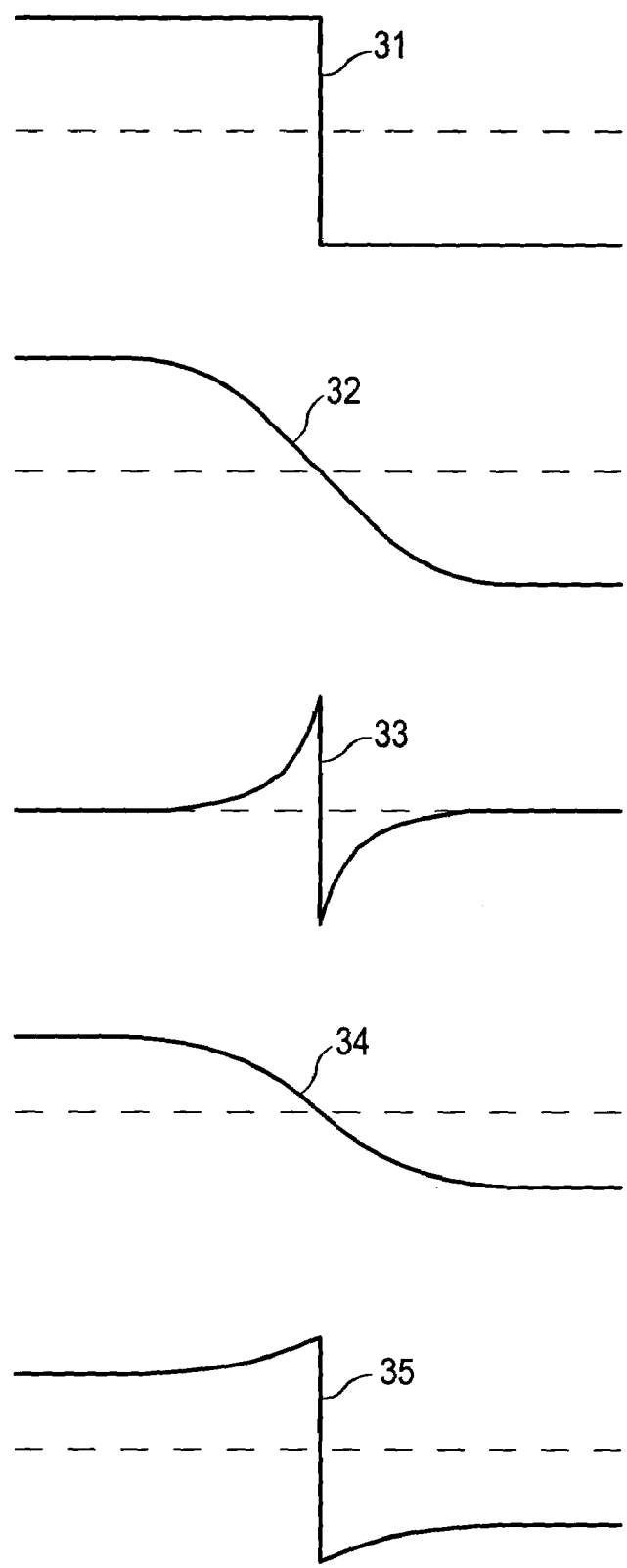
FIGS. 3 and 4 are diagrams providing an overview of the problem of halo effects solved by the present invention.
Figure 4:
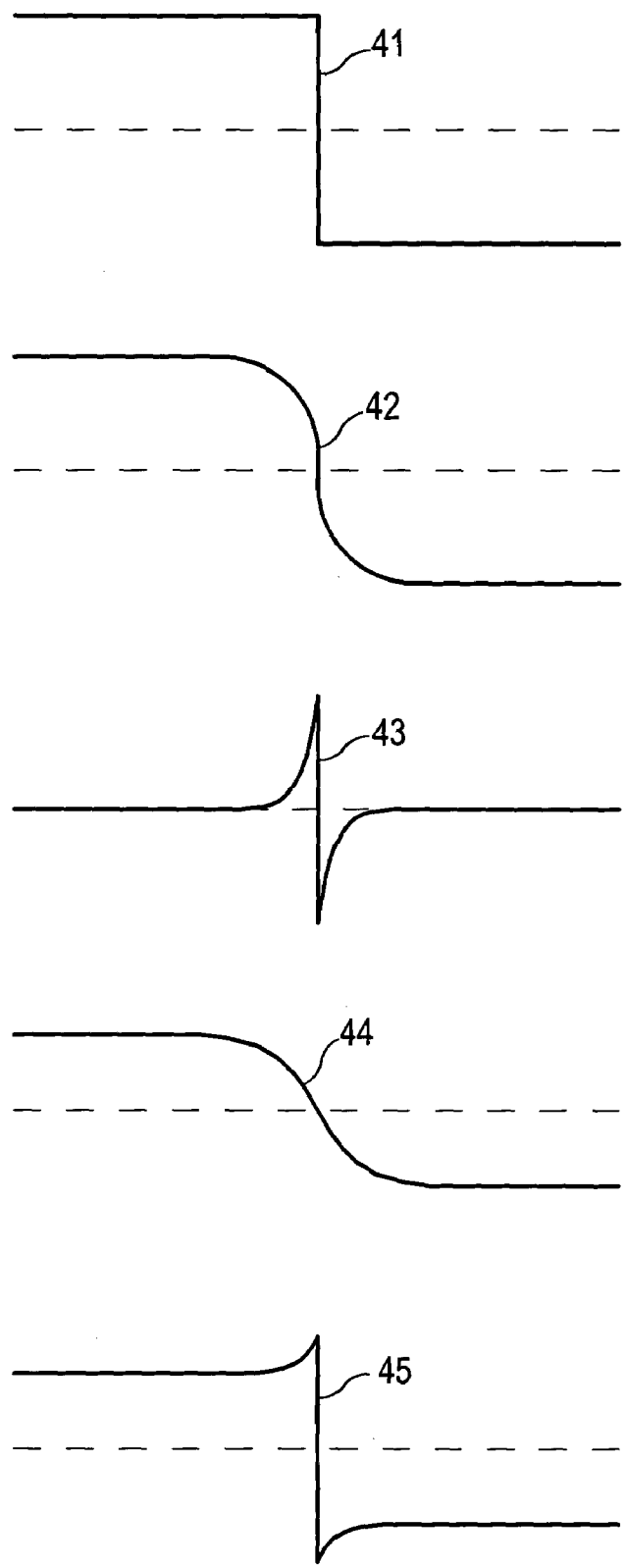

FIGS. 3 and 4 show schematically the influence that the low-pass formation which, according to the invention, has been made dependent on the high-frequency image component has on the range of contrast modification in order to represent the solution of the problem of halo effects visually. The progression of a contrast transition in the brightness profile of the image content is shown schematically in order to reconstruct the occurrence of halo effects. FIG. 3 shows such a discontinuous density progression 31. The low-pass signal 32 is formed within the scope of an automated contrast modification procedure, for example by frequency filtering. This low-pass 32 is subtracted from the original density signal so that the high-pass component remains as the result. In order to undertake image-data contrast compensation, the low-pass component 32 is reduced in conventional procedures in that it is multiplied by a non-linear characteristic curve. In order to explain the invention in the simplified schematic illustration, the low-pass was multiplied by the characteristic-curve function of $2/3$ so that the reduced low-pass 34 results. This low-pass signal reduced during contrast modification is added to the high-pass signal 33 in order to create an image signal in which the detail information is preserved, but the large-area contrast that makes a negative impression with oblique shadows in faces is reduced. This produces the contrast-reduced function 35. For this contrast-reducing density progression 35, the constant density progression of the output signal 31 is no longer in evidence, but is rather a violation either above or below the constant density value in the area of the edge. These so-called over-compensations 36 are noticeable in the image as a distracting halo along the edge. Its occurrence is found to be so distracting since it is visible far into the homogenous image area. This phenomenon may be avoided by the use of edge-dependent low-pass signals during contrast modification. Thus, according to the invention, the low-pass signal at the edges—i.e., in areas of strong high-frequency image components—is loaded with a strong high-frequency component such that either the filter frequency is raised or a component of the high-pass signal is added to the low-pass signal. A pure low-frequency low-pass signal is formed in image areas away from edges. The filter frequency may under certain conditions be selected even lower than in conventional procedures. With this approach, according to the invention, the low-pass signal 42 results from the original image signal 41 shown in FIG. 4 which reproduces the edge of the contrast transition much more clearly than does the low-pass signal 32 shown in FIG. 3. If one then removes this low-pass signal 42 from the original data 41, the high-pass signal 43 results whose dropout is limited to the area recognized to be in the direct vicinity. The reduced low-pass signal that results from this approach based on the invention is designated with 44 in FIG. 4. If this reduced low-pass signal 44 is again added to high-pass signal 43, the image signal 45 with reduced contrast results. Since the edge is not drawn deeply into the homogenous image area by these higher-frequency low-pass signal components in the area of the contrast transition as is seen in 45, the over-compensations that still occur are clearly smaller than those from a conventional procedure shown in FIG. 3. If more higher-frequency components are added to the low-pass signal, the amplitude of the over-compensations may be limited even further. The image impression thus contains only a very narrow area of too much, or too little, density in the vicinity of the edge. Since the eye is drawn to the larger contrast transition, this small variation is not perceived as long as it does not extend deeply into the homogenous area. The distracting halo effects shown schematically in FIG. 3 may thus be greatly limited by the method according to the invention and shown schematically in FIG. 4 for edge-dependent low-pass formation for the purpose of contrast modification so that no distracting artifacts are visible at the contrast transitions, even with strong limitation of the contrast range.

The method described may, of course, be applied to color components in the same manner as to brightness components of the digital image data. The method according to the present invention may also be advantageously applied during modification of color contrast necessary when too few color gradations are available in the output device.

There has thus been shown and described a novel image processing method for automated contrast modification of digital image data which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. In an image-method procedure for automated contrast modification of digital image data in which at least a low and a high-frequency signal component are formed from the image signal of the image data; the low-frequency signal component is modified according to a characteristic-curve function; and then the modified, low-frequency signal component is then added to the high-frequency signal component, the improvement wherein the low-frequency signal component to be modified is formed in dependence upon high-frequency image components derived from the image data.

2. Image-processing method as recited in claim 1, wherein the filter frequency used to form the low-frequency signal component is varied in dependence upon the high-frequency image components.

3. Image-processing method as recited in claim 2, wherein the filter frequency used to form the low-frequency signal component is varied in dependence upon the local frequency spectrum of the image.

4. Image-processing method as recited in claim 1, wherein a high-frequency signal component is added to the low-frequency signal component in the region of high-frequency image components.

5. Image-processing method as recited in claim 1, wherein the high-frequency image components are determined using an edge-detection process.

6. Image-processing method as recited in claim 1, wherein the high-frequency image components are determined from Fourier transforms of the digital image data.

7. Image-processing method as recited in claim 1, wherein the high-frequency image components are determined from the compressed image data.

* * * * *